United States Patent
Aronsson

(10) Patent No.: US 6,440,489 B1
(45) Date of Patent: *Aug. 27, 2002

(54) MOISTURE EXCHANGING ELEMENT AND A METHOD OF ITS MANUFACTURE

(75) Inventor: Per-Johan Aronsson, Sollentuna (SE)

(73) Assignee: Proflute AB, Vallentuna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/712,909

(22) Filed: Nov. 16, 2000

(30) Foreign Application Priority Data

Dec. 9, 1999 (SE) .............................. 9904503

(51) Int. Cl.⁷ .............................. B05D 3/06; B05D 7/04
(52) U.S. Cl. ...................... 427/2.31; 427/245; 427/246; 427/439; 427/374.1; 427/398.1
(58) Field of Search ................................ 427/2.31, 245, 427/246, 439, 374.1, 398.1

(56) References Cited

U.S. PATENT DOCUMENTS

| | | | | |
|---|---|---|---|---|
| 4,911,775 A | * | 3/1990 | Kuma et al. ................. | 156/205 |
| 5,413,789 A | * | 5/1995 | Hagiwara et al. ............ | 424/401 |
| 6,265,030 B1 | * | 7/2001 | Aronson ..................... | 162/111 |

FOREIGN PATENT DOCUMENTS

| SE | WO 93/08910 | 5/1993 |
|---|---|---|
| SE | 501 507 | 3/1995 |

* cited by examiner

*Primary Examiner*—Shrive P. Beck
*Assistant Examiner*—Jennifer Kolb Michener
(74) *Attorney, Agent, or Firm*—Young & Thompson

(57) ABSTRACT

The invention relates to a bacteriostatic dehumidifying element that includes additives which inhibit the growth of microorganisms. The dehumidifying element is produced by a method that comprises the steps of:

a) providing a piece of paper, such as facing paper and/or fluted paper;

b) immersing the paper in a highly concentrated waterglass solution at a temperature c) in the range of 45–95° C., where said highly concentrated waterglass solution has a viscosity of at least 350 mPa·s at a temperature of 45° C.;

d) cooling the immersed paper with air at a temperature of at highest 35° C., aid preferably at highest 25° C.;

e) with a starting point from the paper in step c), producing a waterglass-impregnated fibre matrix followed by a chemical conversion of the waterglass on said paper with the aid of known processes for producing a moisture exchange element; and f) impregnating the moisture exchange element of step d) with one or more aqueous solutions of an hygroscopic salt and a water soluble substance that inhibits the growth of microorganisms.

4 Claims, 3 Drawing Sheets

LAMINATE TO DEHUDIMIFIER ROTER

FACING PAPER

FLUTED PAPER (vave amplitude 1-3 mm)

DEHUMIDIFYING ROTOR

PART SECTOR

PRINCIPLE FOR SORPTIONDEHUMIDIFIER

MOISTURE EXCHANGING ELEMENT AND A METHOD OF ITS MANUFACTURE

The present invention relates to the dehumidification of air with the aid of a moisture exchanging element, such as a heat exchanging element and dehumidifying element. An inventive moisture exchanging element is comprised of a fibre matrix that has been impregnated with waterglass. More specifically, the invention relates to a dehumidifying element that has bacteriostatic properties, and to a method of its manufacture.

BACKGROUND OF THE INVENTION

Figure 5:
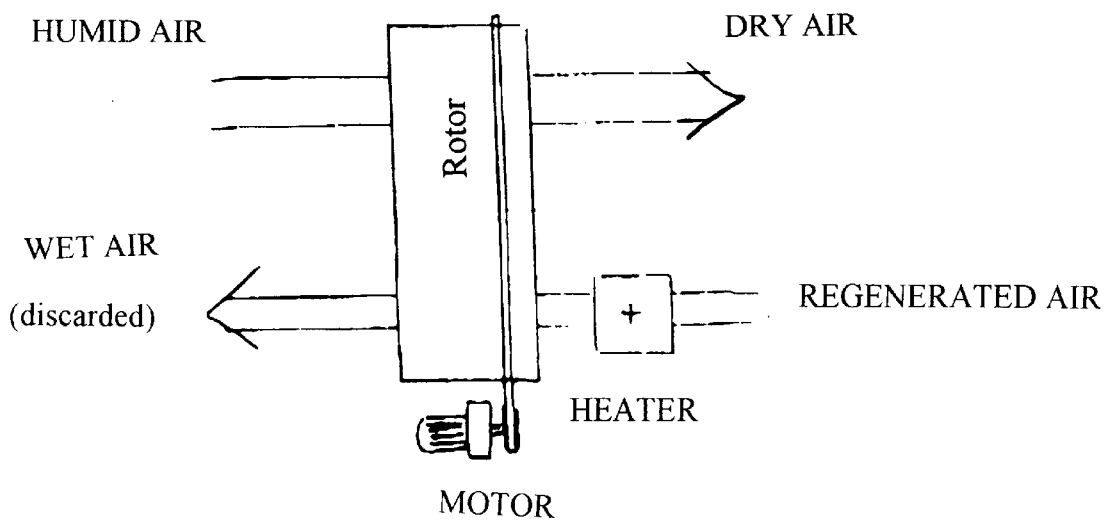

It is necessary to control the humidity of the air in conjunction with certain manufacturing processes and in the storage of moisture-sensitive products. A control of this nature is also often applied in order to avoid corrosion of expensive equipment. It is normally necessary to dehumidify the air, which can be achieved with the aid of different types of air dehumidifiers. The so-called rotary sorption dehumidifier is an example of a typical air dehumidifier. Such dehumidifiers are described in SE-B-462 671, SE-B-501 507 and WO 93/08910, among other documents. FIG. 5 outlines a rotary sorption dehumidifier of this kind.

Swedish Patent Application 9804152-8, which was published after the filing date of the present application, describes an advantageous process for the manufacture of dehumidifying elements, in which paper is impregnated with a highly concentrated waterglass solution. The advantage with this process is that no energy consuming drying stage is required.

The rotor is a cylinder that has a matrix which is comprised of alternate thin pleated and planar walls that contain an hygroscopic substance, such as silica gel. The walls form in the direction of airflow narrow channels through which the air flows. Heated air that releases moisture that has fastened to the walls is conducted through a smaller sector, This air flow is then passed outside the space that shall be kept dry, via a channel system. Dry air is obtained continuously as the rotor rotates between the two air flows.

The hygiene requirements are very high in certain applications, for instance in the manufacture of pharmaceutical products and the production of foodstuffs. This will not normally constitute a problem, as it is difficult for bacteria to grow in the rotor. Most rotors have an inorganic composition and thus contain no bacteria nutrients. Furthermore, the rotor is heated at regular intervals during operation between temperatures of 100 and 140° C., and is very dry during the whole of the cycle. Consequently, the environment is sufficiently hostile to microorganisms to satisfy hygiene requirements in operation.

However, it is difficult with conventional techniques to guarantee low bacterial growth in dehumidifying elements over long periods of inactivity. Organic material, for instance in the form of dust particles, may have fastened in the rotor and favourable conditions for microorganisms can occur locally because no heating or drying of the element takes place.

Problems can also occur when exchanging heat from air to air, including bad odours and spreading of bacteria among other things, since the moisture content of the air shall also be transferred in rotary heat exchangers (enthalpy exchange). Some of these problems may have connection with bacterial growth in the heat exchange element, which is very similar to that described above.

There is thus a need for a moisture exchange element that includes one or more components which actively counteract the growth of microorganisms.

SUMMARY OF THE INVENTION

It has now been found that a bacteriostatic moisture exchange element that solves the aforesaid problems of malodours and the growth of microorganisms can be produced by a method comprising the steps of:

a) providing paper, such as facing paper and/or fluted paper, b) immersing the paper in a highly concentrated waterglass solution at a temperature in the range of 45–95° C., where said highly concentrated waterglass solution has a viscosity of at least 350 mPa·s at a temperature of 45° C.

c) cooling the immersed paper with air at a temperature of 35° C. at the highest, and preferably at 25° C. at the highest;

d) producing a waterglass impregnated fibre matrix with a starting point from the paper in step c), followed by chemical conversion of the waterglass on said paper with the aid of known processes for the manufacture of a moisture exchange element; and e) impregnating the moisture exchange element in step d) with one or more aqueous solutions of an hygroscopic salt and a water soluble substance that inhibits the growth of microorganisms.

Definitions

The term "moisture exchange element" as used in this document refers to elements that are able to reduce the moisture content of air. Examples of moisture exchange elements are heat exchange elements in rotary heat exchangers for air-to-air heat exchange, and air dehumidifying elements. An inventive moisture exchange element is comprised of a fibre matrix that has been impregnated with waterglass.

The term "waterglass", as used in this document, relates to aqueous solutions of sodium silicate ("soda waterglass") or potassium silicate ("potash waterglass"). Soda waterglass and potash waterglass are often designated as $(Na_2O)_m(SiO_2)_n$ and $(K_2O)_m SiO_2)_n$ respectively, and the mole ratio between the two oxides (n/m) can vary, as will be apparent. In the case of the present invention, soda waterglass with n/m in the range of 3.2–3.5 is preferred, and waterglass with n/m from 3.3 to 3.4 is particularly preferred.

The term "highly concentrated waterglass" as used in this document refers to waterglass that has a viscosity of at least 350 mPa·s at 45° C. The upper viscosity limit is 800 mPa·s at 95° C. The viscosity of highly concentrated waterglass at room temperature is so high as to make it extremely difficult to immerse paper in the waterglass at this temperature in practice and therewith cause the waterglass to wet the paper. Typically concentrated waterglass according to known technology has a viscosity of up to 200 mPa·s at 20° C. Highly concentrated waterglass, on the other hand, has a much higher viscosity at 20° C. and in its lowest concentrated form can be likened to cold syrup.

The term "paper" as used in this document relates to sheets produced from organic fibres, such as cellulose, or from inorganic fibres, such as ceramic fibres, glass fibres, slag fibres, carbon fibres, mineral fibres and mixtures thereof. Inorganic fibres are preferred. It is also preferred to use glass fibres and/or mineral fibres with an admixture of up to 20% cellulose fibres or synthetic fibres. The paper will have a typical thickness of 0.1–0.3 mm. The flute height of the fluted or corrugated paper is typically 1–5 mm and its flute length is typically 1.5–7 mm. The weight of the paper is typically 20–50 g/m².

The term "hygroscopic salt" as used in this document refers to salts that are able to absorb air-carried water.

According to the invention, the absorption capacity of hygroscopic salts shall be such that the salts will be in a dissolved state at the relative humidities in which bacteria thrive. Examples of such salts are chlorides, bromides and iodides of lithium, sodium, potassium, magnesium and calcium. Lithium chloride, calcium chloride and sodium chloride are particularly preferred.

The expression "water soluble substances capable of inhibiting the growth of microorganisms" as used in this document refers to water soluble substances that have a growth inhibiting ability. Examples of such substances are azides, such as sodium azide, and water soluble silver and copper salts, such as silver nitrate, copper nitrate and copper sulphate. In principle, the invention can be practised with any water soluble substance whatsoever, provided that said substance will inhibit the growth of microorganisms.

With regard to the selection of hygroscopic salts and water soluble substances that are capable of inhibiting the growth of microorganisms, it is necessary that their use in conjunction with moisture exchanging elements will not endanger human beings and the environment. Neither should they have a negative effect on the ability of the rotor to absorb moisture. Another important factor is that costs can be kept low.

DETAILED DESCRIPTION OF THE INVENTION

The present invention thus relates to a moisture exchange element that has been treated in a manner such as to greatly reduce the risk of growth of microorganisms, and then particularly bacteria in the moisture exchange element, even when said element is not in operational use. The moisture exchange element, e.g. a rotary sorption dehumidifier rotor, is treated by submersing or immersing the element in one or more aqueous solutions of an hygroscopic salt on the one hand, and a microorganism growth inhibiting substance on the other hand.

The inventive moisture exchange element is produced by a process that utilises highly concentrated waterglass. The waterglass is so highly viscous as to prevent paper from being impregnated therewith at room temperature in practice. However, when the highly concentrated waterglass is heated to a temperature of 45–95° C., it becomes thinly fluid and functions as concentrated waterglass. The paper to be impregnated is thus immersed into hot highly concentrated waterglass and thereafter cooled with air that has a temperature of 35° C. at the highest, preferably not higher than 25° C. No drying process is required, which is a cost-saving factor. The cooled impregnated paper also has effective adhesion properties and can be readily combined into a finished moisture exchange element.

Highly concentrated waterglass can be produced, for instance, by evaporating some of the water present in the concentrated waterglass prior to manufacture.

In conventional waterglass impregnation processes, the impregnated paper is heat-dried. In conjunction with this process, the waterglass becomes thinly fluid and begins to run. There is no danger of this occurring in the inventive process, since the highly concentrated waterglass solidifies in the cooling stage of the process.

In the manufacture of the moisture exchange element, the paper that has been impregnated with waterglass is then dipped into a solution of both acid and metal salt, wherewith the composition has been chosen so that the product will obtain good mechanical strength and a high moisture exchange capacity. Examples of metal salts can be found in SE-B-462 671. Suitable acids are sulphuric acid to metal sulphates, phosphoric acid to metal phosphates, nitric acid to metal nitrates, and hydrochloric acid to metal chlorides. A metal salt solution provides a gel of good stability, although because a low pH is required to obtain good moisture absorption capacity it is necessary that a large salt surplus is present in order to be able to obtain a low pH. Although the capacity of the gel is good when solely acid is used, the gel readily breaks down in normal dehumidifying processes.

The resultant moisture exchange element is washed with water after this stage. Finally, the moisture exchange element is dipped in an aqueous solution that contains hygroscopic salt and microorganism-inhibiting substances so as to obtain a bacteriostatic moisture exchange element.

This process has many advantages. The process enables more waterglass to be used per unit of paper area, since the highly concentrated waterglass is, of course, more concentrated than concentrated waterglass. This provides the end product with a higher moisture absorption capacity. Energy consumption, and therewith production costs are lower since no drying is required after the impregnation process. Large amounts of energy are consumed when drying wet paper, as it is often necessary to use hot air or IR lamps to this end. Neither is it necessary to provide expensive drying equipment. Finally, the properties of the product are improved by virtue of the fact that there is no danger of the waterglass beginning to run after the impregnation stage.

Figure 1:
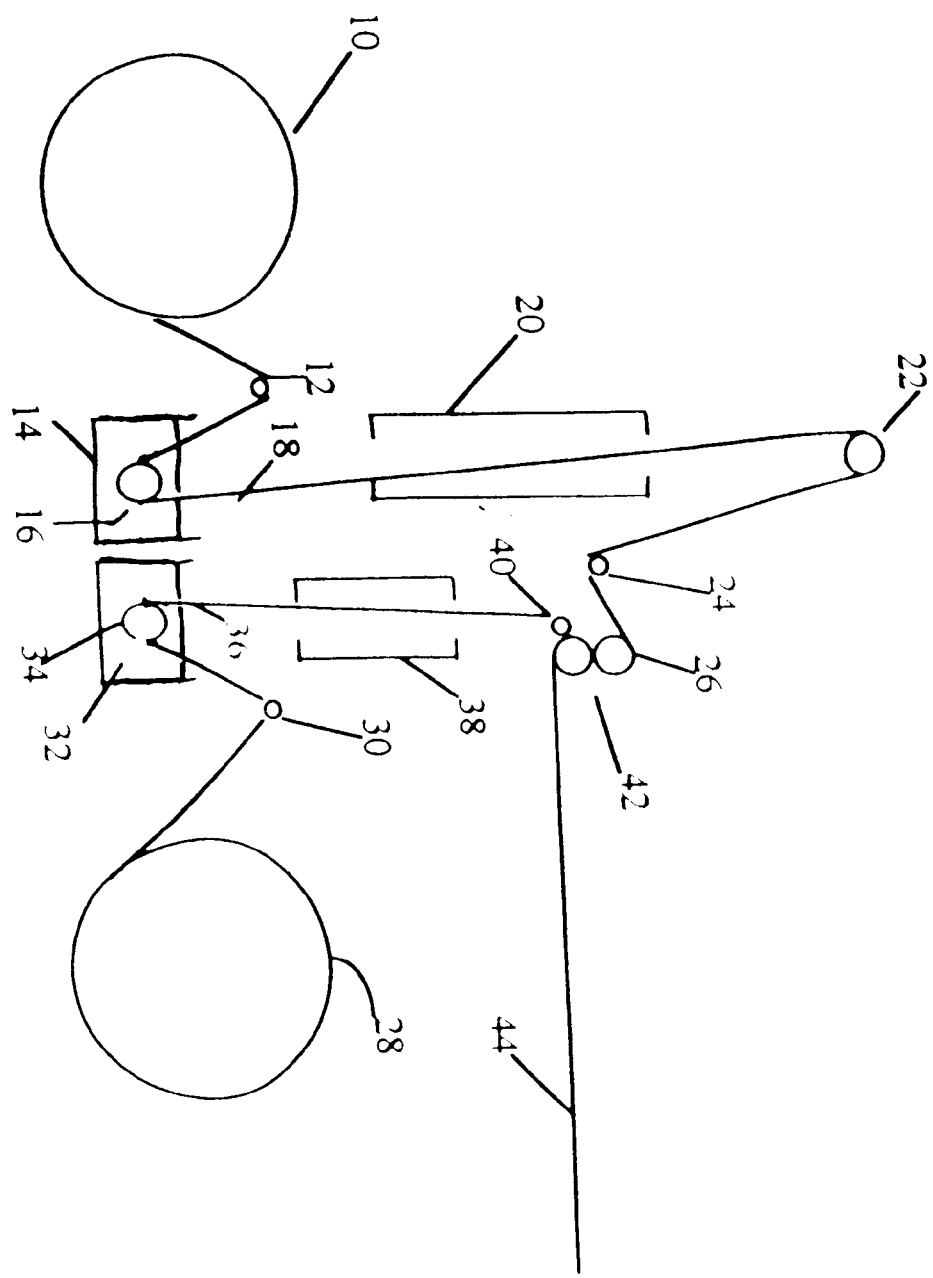
Figure 2:
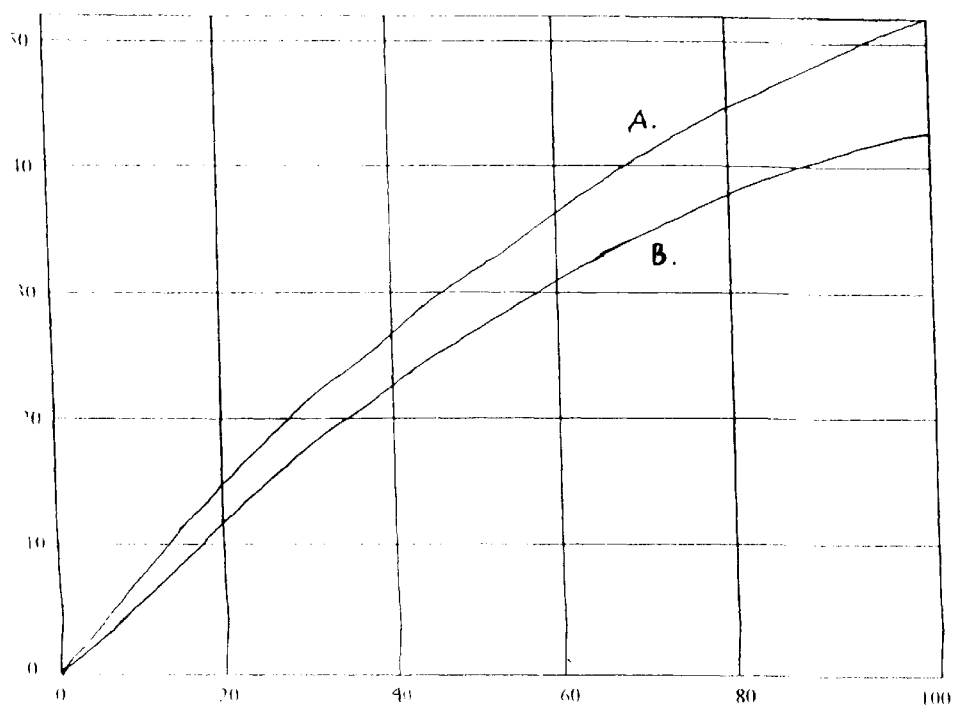

The invention will now be described in more detail with reference to the accompanying drawings, in which FIG. 1 is an explanatory sketch of a process for the production of an inventive dehumidifying element, FIG. 2 is a diagram showing equilibrium curves for materials used in dehumidifying elements. The moisture quotient (g absorbed water/100 g dry material) is plotted as a function of the relative humidity of a material produced in accordance with the invention (A) on the one hand and for material produced conventionally (B) on the other hand.

Figure 3:
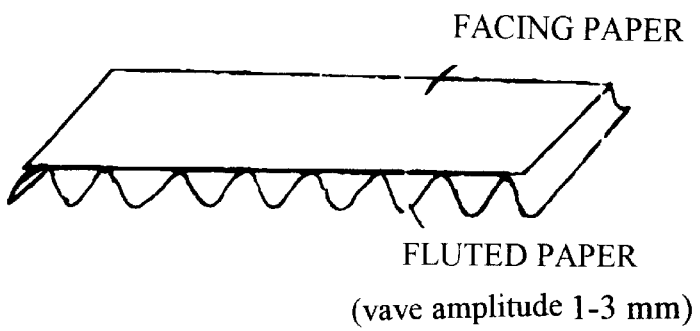
Figure 4:
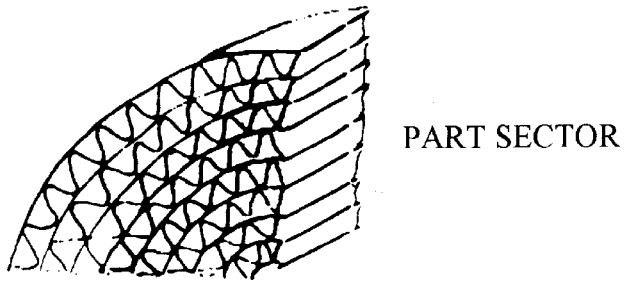

FIG. 3 illustrates a laminate comprised of facing paper and fluted paper, used in the production of the rotor (dehumidifying element) of an air dehumidifier FIG. 4 is a part-sector of the finished dehumidifying rotor. The rotor is comprised of a laminate, such as the laminate shown in FIG. 3, that has been wound about an axis in the manufacture of the rotor.

FIG. 5 illustrates the principle according to which the dehumidifying element functions. The air to be dehumidified is allowed to flow through channels in a rotary dehumidifying element. Heated air is, at the same time, allowed to pass in counterflow through another sector of the rotating dehumidifying element.

The plant illustrated in FIG. 1 includes rolls of paper web 10 and 28. The paper web is unreeled from the roll 10 and guided over a guide roller 12 down into a bath 14 that contains heated, highly concentrated waterglass. Data for typically highly concentrated waterglass suitable for use in conjunction with the present invention will be apparent from Table 1 below.

TABLE 1

Examples of data relating to highly concentrated waterglass solutions.

| | |
|---|---|
| Mole ratio $SiO_2/Na_2O$ | 3.3–3.4 |
| Density (kg/dm$^3$) | 1.41–1.45 |

TABLE 1-continued

Examples of data relating to highly
concentrated waterglass solutions.

| | |
|---|---|
| Usable in the range | 45–90° C. |
| Optimal density (kg/dm³) | 1.43 |
| Optimal temperature | 70° C. |

Table 2 below gives two examples of highly concentrated waterglass solutions and their respective viscosities. The solutions are chosen to lie close to the limits of the viscosity that applies to highly concentrated waterglass solutions in accordance with the invention.

TABLE 2

Examples of data relating to two highly
concentrated waterglass solutions.

| | Example A | Example B |
|---|---|---|
| Mole ratio $SiO_2/Na_2O$ | 3.35 | 3.35 |
| Density (kg/dm³) | 1.425 | 1.450 |
| Viscosity | 377 mP.s at 45° C. | 800 mPa.s at 90° C. |

The paper web 18 is guided to beneath the level of the highly concentrated, hot waterglass solution (having a temperature of 45–95° C.) in the bath 14 with the aid of a roller 16 that is immersed in the solution. As it passes through the bath 14, the paper web 18 is soaked with highly concentrated waterglass solution to the extent of saturation. After being saturated, the paper web passes up through a cooling chamber 20 room temperature air is blown onto the web 18. paper web 18 is then delivered to fluting roll 26 via guide rollers 22 and 24, so as to form fluted paper having a large number of narrow pleats or folds in the web. As before mentioned, the resultant fluted paper has a typical flute height of 1–5 mm and a flute length of 1.5–7 mm. A second paper web 36 is unwound from the paper roll 28 and passed, via a guide roller 30, to a bath 32 which contains heated, highly concentrated waterglass solution and in which the paper web 36 is immersed via a roller 34. The paper web 36 is soaked in the bath and allowed to pass up through cooling chamber 38, where room temperature air is blown onto the web 36. The paper web 36 is passed from the cooling chamber 38 to a combining roll 42, via a guide roller 40, where the two papers webs 18 and 36 are combined to form an impregnated fluted or corrugated paper matrix. Because the impregnated paper webs 18 and 36 readily adhere to one another after the cooling stage, no adhesive is required to this end.

The inventive process leads to a matrix that contains 10–25% more silica gel than do matrices produced with known techniques when using the same type of paper, applying the same volume of waterglass, and creating geometrically and dimensionally similar types of matrices. This is illustrated in FIG. 2, which shows two equilibrium curves for material in dehumidifying elements. Curve A relates to a material produced in accordance with the present invention, whereas curve B represents conventional material produced in accordance with SE 469 976. It is assumed that A and B are produced from identical fibre paper starting material that has been coated with the same thick layer of highly concentrated waterglass in respect of curve A and typically concentrated waterglass in respect of curve B.

Subsequent to conventional combination of the impregnated paper and a conventional gelation stage (see for instance SE 469 976), the thus produced moisture exchange element undergoes at least one further process stage in which it is impregnated with a solution that contains at least one hygroscopic salt and at least one water-soluble substance that inhibits the growth of microorganisms, therewith obtaining a bacteriostatic moisture exchange element.

Because the finished moisture exchange element contains an hygroscopic salt which is in solution in an environment of relative humidity suitable for microorganisms, the inorganic growth inhibiting substance will also be in solution, which results in an amplified inhibiting effect even at low concentrations. This reduces cost and possibly the influence on human beings and environment. Larger quantities would have been required in a solid state, with subsequent negative effects on said factors.

The amount of hygroscopic salt in the moisture exchange element will preferably be low. The salt absorbs water from the air and forms a salt solution. The more salt, the more solution that it liable to form. Consequently, there is a risk that the volume of solution will exceed the liquid retention capacity of the moisture exchange element if the amount of salt becomes too high.

The following example of the composition of the impregnation solution has been found to give good bacteria growth inhibiting properties and moisture exchange function:

| | Impregnation solution concentration in percent by weight in a non-aqueous form |
|---|---|
| Hygroscopic salt | |
| Lithium chloride (LiCl) | 2–6 |
| Calcium chloride (KCl) | 3–10 |
| Sodium chloride (NaCl) | 3–10 |
| Bacteria growth inhibiting substance | |
| Silver nitrate ($AgNO_3$) | 0.003 |
| Copper nitrate ($Cu(NO_3)_2$) | 0.07 |
| Copper sulphate ($CuSO_4$) | 0.07 |

A moisture exchange element including silica gel and produced in the aforedescribed manner contains between 80 and 85% by weight adsorbent while the remainder is comprised of a fibre matrix that forms a carrier. The density is 230–260 g/l in a dry state. When such a moisture exchange element is subjected to the aforesaid impregnation process by being dipped into said solutions, and any liquid residues present in the channels are blown therefrom and the element subsequently dried, the element will have the following composition with respect to the additives proposed here.

| | % by weight in respect of a dry rotor |
|---|---|
| Hygroscopic salt (non-aqueous) | |
| Lithium chloride | 1.5–5 |
| Calcium chloride | 2.5–9 |
| Sodium chloride | 2.5–9 |
| Bacteria inhibiting substance (non-aqueous) | |
| Silver nitrate | 0.002–0.003 |
| Copper nitrate | 0.05–0.07 |
| Copper sulphate | 0.05–0.07 |

What is claimed is:

1. A method of producing a bacteriostatic moisture exchange element comprising the steps of:
   a) providing a piece of paper;
   b) immersing the paper in a concentrated waterglass solution at a temperature in the range of 45–95° C., wherein said concentrated waterglass solution has a viscosity of at least 350 mPa.s at a temperature of 45° C. and wherein said viscosity substantially prevents the paper from being impregnated with said waterglass solution at room temperature;
   c) cooling the immersed paper with air at a temperature no grater than 35° C.
   d) producing from said cooled paper a waterglass-impregnated fiber matrix followed by a chemical conversion of the waterglass on said paper to produce a moisture exchange element; and
   e) impregnating said moisture exchange element with at least one aqueous solution of a hygroscopic salt and a water soluble substance that inhibits the growth of microorganisms.

2. A method according to claim 1, wherein said hygroscopic salt is selected from the group consisting of chlorides, bromides and iodides of lithium, sodium, potassium, magnesium and calcium.

3. A method according to claim 2, wherein the hygroscopic salt is selected from the group consisting of lithium chloride, calcium chloride and sodium chloride.

4. A method according to claim 1, wherein the water soluble substance that inhibits the growth of microorganisms is a water soluble silver salt or copper salt or an azide.

* * * * *